(12) United States Patent
Chao et al.

(10) Patent No.: US 9,528,837 B2
(45) Date of Patent: Dec. 27, 2016

(54) MOBILE DEVICE POSITION UNCERTAINTY BASED ON A MEASURE OF POTENTIAL HINDRANCE OF AN ESTIMATED TRAJECTORY

(71) Applicant: QUALCOMM Incorporated, San Diego, CA (US)

(72) Inventors: Hui Chao, San Jose, CA (US); Sameera Poduri, Sunnyvale, CA (US); Payam Pakzad, Mountain View, CA (US); Ayman Fawzy Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/296,117

(22) Filed: Jun. 4, 2014

(65) Prior Publication Data

US 2015/0354969 A1    Dec. 10, 2015

(51) Int. Cl.
*G01C 21/00* (2006.01)
*G01C 21/20* (2006.01)
*G01S 5/02* (2010.01)
*G01C 21/16* (2006.01)

(52) U.S. Cl.
CPC .......... *G01C 21/206* (2013.01); *G01C 21/165* (2013.01); *G01S 5/02* (2013.01); *G01S 5/0294* (2013.01)

(58) Field of Classification Search
USPC ...... 701/1–100, 300–301, 400–541; 348/169
See application file for complete search history.

(56) References Cited

U.S. PATENT DOCUMENTS 5,959,575 A * 9/1999 Abbott ............... G01C 21/00
                                               342/357.31
6,396,413 B2 * 5/2002 Hines ............... G07C 9/00111
                                               340/539.13

(Continued)

FOREIGN PATENT DOCUMENTS

WO    WO-2013110971 A1    8/2013
WO    WO-2013112376 A1    8/2013

OTHER PUBLICATIONS

Evennou F., et al., "Advanced Integration of WiFi and Inertial Navigation Systems for Indoor Mobile Positioning," EURASIP Journal on Applied Signal Processing, Hindawi Publishing Corporation, 2006, vol. 2006, Article ID 86706, pp. 1-11.

(Continued)

*Primary Examiner* — Jonathan M Dager
(74) *Attorney, Agent, or Firm* — Berkeley Law & Technology Group, LLP

(57) ABSTRACT

Various techniques are provided for identifying a position uncertainty of a mobile device, such as, based, at least in part, on a measure of potential hindrance of an estimated trajectory. For example, an example method may comprise estimating a trajectory of the mobile device within a particular environment, determining a measure of potential hindrance for at least a portion of the trajectory based, at least in part, on an electronic map that is indicative of a presence or an absence of one or more obstacles, and presenting an indication of a position uncertainty to a user of the mobile device. The position uncertainty may be based, at least in part, on the measure of potential hindrance.

29 Claims, 7 Drawing Sheets

(56) References Cited

U.S. PATENT DOCUMENTS

| | | | | |
|---|---|---|---|---|
| 7,778,112 B2* | 8/2010 | Behm | A61H 3/061 | 135/911 |
| 7,991,576 B2* | 8/2011 | Roumeliotis | 702/159 | |
| 9,135,705 B2* | 9/2015 | Chao | H04N 17/002 | |
| 9,377,310 B2* | 6/2016 | Stipes | G01C 21/165 | |
| 9,395,190 B1* | 7/2016 | Young | G01C 21/206 | |
| 2005/0048987 A1* | 3/2005 | Glass | H04M 1/72544 | 455/456.1 |
| 2006/0019679 A1* | 1/2006 | Rappaport | H04W 64/00 | 455/456.5 |
| 2006/0129308 A1* | 6/2006 | Kates | A61H 3/061 | 701/532 |
| 2006/0293839 A1* | 12/2006 | Stankieiwcz et al. | 701/200 | |
| 2007/0088498 A1* | 4/2007 | Pazos | G01C 21/005 | 701/408 |
| 2009/0054076 A1* | 2/2009 | Evennou | G01S 5/0252 | 455/456.1 |
| 2009/0093959 A1* | 4/2009 | Scherzinger | G01C 21/165 | 701/470 |
| 2009/0201176 A1* | 8/2009 | Shimada | G01C 21/20 | 340/944 |
| 2009/0262974 A1* | 10/2009 | Lithopoulos | G06T 7/0042 | 382/100 |
| 2010/0125409 A1* | 5/2010 | Prehofer | G01C 21/3484 | 701/408 |
| 2010/0235091 A1* | 9/2010 | Das | G01C 21/3602 | 701/532 |
| 2011/0077852 A1* | 3/2011 | Ragavan | G01C 21/3682 | 701/533 |
| 2011/0082638 A1* | 4/2011 | Khorashadi | G01C 21/20 | 701/532 |
| 2011/0137608 A1* | 6/2011 | Wang | G01C 21/20 | 702/150 |
| 2011/0178705 A1 | 7/2011 | Pakzad et al. | | |
| 2011/0282622 A1* | 11/2011 | Canter | G06K 9/00691 | 702/150 |
| 2011/0307172 A1* | 12/2011 | Jadhav | G09B 21/001 | 701/491 |
| 2012/0044265 A1* | 2/2012 | Khorashadi | G01C 21/206 | 345/641 |
| 2012/0072100 A1* | 3/2012 | Mate | H04W 4/026 | 701/300 |
| 2012/0072110 A1* | 3/2012 | Venkatraman | G01O 5/06 | 701/434 |
| 2012/0143495 A1* | 6/2012 | Dantu | G01C 21/206 | 701/428 |
| 2012/0176525 A1* | 7/2012 | Garin | G01C 21/20 | 348/333.02 |
| 2012/0195215 A1* | 8/2012 | Jeong | H04W 64/006 | 370/252 |
| 2012/0223843 A1* | 9/2012 | Wall et al. | 340/944 | |
| 2013/0016012 A1* | 1/2013 | Beauregard | H04W 4/043 | 342/450 |
| 2013/0053056 A1* | 2/2013 | Aggarwal | G01S 5/0263 | 455/456.1 |
| 2013/0122935 A1* | 5/2013 | Das | H04W 4/028 | 455/456.3 |
| 2013/0131973 A1* | 5/2013 | Friedler | G01C 21/20 | 701/409 |
| 2013/0218456 A1* | 8/2013 | Zelek | G01C 21/3652 | 701/412 |
| 2013/0244693 A1 | 9/2013 | Das et al. | | |
| 2013/0257657 A1* | 10/2013 | Garin | G01C 21/206 | 342/451 |
| 2013/0267178 A1* | 10/2013 | Pakzad | H04W 4/028 | 455/67.7 |
| 2013/0311084 A1* | 11/2013 | Lundquist | G01C 21/005 | 701/430 |
| 2013/0335273 A1* | 12/2013 | Pakzad | G01C 21/206 | 342/458 |
| 2013/0344901 A1* | 12/2013 | Garin | H04W 4/026 | 455/456.6 |
| 2013/0345967 A1* | 12/2013 | Pakzad | G01C 21/206 | 701/431 |
| 2014/0114561 A1* | 4/2014 | Pakzad | G01C 21/206 | 701/410 |
| 2014/0153773 A1* | 6/2014 | Gupta | G06K 9/6202 | 382/103 |
| 2014/0162589 A1* | 6/2014 | Gupta | H04W 64/003 | 455/404.2 |
| 2014/0192658 A1* | 7/2014 | Venkatraman | G01S 19/14 | 370/252 |
| 2014/0214427 A1* | 7/2014 | Chao | G10L 15/30 | 704/270.1 |
| 2014/0241614 A1* | 8/2014 | Lee | H04N 13/004 | 382/154 |
| 2014/0274116 A1* | 9/2014 | Xu | G01S 11/06 | 455/456.1 |
| 2014/0274151 A1* | 9/2014 | Pattabiraman | H04W 4/043 | 455/456.3 |
| 2014/0278054 A1* | 9/2014 | Tidd | G01C 21/00 | 701/409 |
| 2014/0309835 A1* | 10/2014 | Yamamoto | 701/25 | |
| 2014/0323163 A1* | 10/2014 | Venkatraman | G01S 5/0252 | 455/457 |
| 2014/0342662 A1* | 11/2014 | Das | H04W 4/02 | 455/39 |
| 2014/0347492 A1* | 11/2014 | Fales | G01C 11/06 | 348/164 |
| 2014/0364101 A1* | 12/2014 | Do | H04W 4/02 | 455/418 |
| 2015/0071524 A1* | 3/2015 | Lee | G06T 7/0075 | 382/154 |
| 2015/0178565 A1* | 6/2015 | Rivlin et al. | 348/169 | |
| 2015/0195682 A1* | 7/2015 | Lee | H04W 4/04 | 455/456.1 |
| 2015/0249907 A1* | 9/2015 | Gupta | H04W 4/043 | 455/456.1 |
| 2015/0316383 A1* | 11/2015 | Donikian | G01C 22/006 | 701/408 |
| 2015/0341233 A1* | 11/2015 | Marri Sridhar | G01S 5/0252 | 370/252 |
| 2015/0373500 A1* | 12/2015 | Chen | H04W 4/028 | 455/456.1 |
| 2016/0007158 A1* | 1/2016 | Venkatraman | H04W 4/023 | 455/456.2 |

OTHER PUBLICATIONS

Lee H., et al., "Localization of mobile users using trajectory matching," Proceedings of the first ACM international workshop on Mobile entity localization and tracking in GPS-less environments, 2008, pp. 123-128.

International Search Report and Written Opinion—PCT/US2015/034085—ISA/EPO—Sep. 28, 2015.

Widyawan, et al., "A novel backtracking particle filter for pattern matching indoor localization", Proceedings of the First ACM International Workshop on Mobile Entity Localization and Tracking in GPS-Less Environments, Melt '08, Jan. 1, 2008, 5 pages, XP055038756, New York, USADOI: 10.1145/1410012.1410031, ISBN: 978-1-60-558189-7.

* cited by examiner

MOBILE DEVICE POSITION UNCERTAINTY BASED ON A MEASURE OF POTENTIAL HINDRANCE OF AN ESTIMATED TRAJECTORY

BACKGROUND

1. Field

The subject matter disclosed herein relates to electronic devices, and more particularly to methods, apparatuses and articles of manufacture for use by and/or in a mobile device to identify a position uncertainty based, at least in part, on a measure of potential hindrance of an estimated trajectory of the mobile device.

2. Information

As its name implies, a mobile device may be moved about, for example, typically being carried by a user and/or possibly a machine. By way of some non-limiting examples, a mobile device may take the form of a cellular telephone, a smart phone, a tablet computer, a laptop computer, a wearable computer, a navigation and/or tracking device, etc.

A position and/or movements of a mobile device may be determined, at least in part, by a positioning and/or navigation capability (herein after simply referred to as a positioning capability) that may be implemented on board the mobile device, in one or more other electronic devices, and/or some combination thereof. Certain positioning capabilities may be based on one or more wireless signals transmitted by one or more transmitting devices and acquired by mobile device. By way of example, certain wireless signal-based positioning capabilities make use of wireless signals acquired from a satellite positioning system (SPS), such as, the global positioning system (GPS), etc.

In another example, certain wireless signal-based positioning capabilities make use of wireless signals acquired from terrestrial-based wireless transmitting devices, such as, e.g., a dedicated positioning Beacon transmitting device, an access point (AP) device which may be part of a wireless local area network, a base transceiver station which may be part of the cellular telephone system, and/or the like or some combination thereof. In certain implementations, a positioning capability may make use of one or more electronic files, such as, e.g., an electronic map, a routability graph, a radio heatmap, and/or the like or some combination thereof, to determine a position and/or other movements of the mobile device within a particular environment.

Since users of mobile devices tend to rely on the positioning and navigation capabilities of the mobile devices, it may be useful to provide a user experience that is indicative of the user's perception regarding certain positioning/navigation errors as opposed to smoothing or filtering such errors out.

SUMMARY

In accordance with certain aspects, an example method may be provided at a mobile device which comprises: estimating a trajectory of the mobile device within a particular environment comprising an indoor region, the trajectory extending from a first position towards a second position; determining a measure of potential hindrance for at least a portion of the trajectory based, at least in part, on an electronic map that is indicative of a presence or an absence of one or more obstacles within at least the portion of the trajectory; and presenting an indication of a position uncertainty to a user of the mobile device, the position uncertainty being based, at least in part, on the measure of potential hindrance.

In accordance with certain aspects, an example mobile device may be provided which comprises: a user interface mechanism; and a processing unit coupled to the user interface mechanism and configured to: estimate a trajectory of the mobile device within a particular environment comprising an indoor region, the trajectory extending from a first position towards a second position; determine a measure of potential hindrance for at least a portion of the trajectory based, at least in part, on an electronic map that is indicative of a presence or an absence of one or more obstacles within at least the portion of the trajectory; and initiate presentation of an indication of a position uncertainty via the user interface mechanism, the position uncertainty being based, at least in part, on the measure of potential hindrance.

In accordance with certain aspects, an example apparatus may be provided for use in a mobile device, the apparatus may comprise: means for estimating a trajectory of the mobile device within a particular environment comprising an indoor region, the trajectory extending from a first position towards a second position; means for determining a measure of potential hindrance for at least a portion of the trajectory based, at least in part, on an electronic map that is indicative of a presence or an absence of one or more obstacles within at least the portion of the trajectory; and means for presenting an indication of a position uncertainty, the position uncertainty being based, at least in part, on the measure of potential hindrance.

In accordance with certain aspects, an example article of manufacture may be provided which comprises a non-transitory computer readable medium have stored therein computer implementable instructions executable by a processing unit of a mobile device to: estimate a trajectory of the mobile device within a particular environment comprising an indoor region, the trajectory extending from a first position towards a second position; determine a measure of potential hindrance for at least a portion of the trajectory based, at least in part, on an electronic map that is indicative of a presence or an absence of one or more obstacles within at least the portion of the trajectory; and initiate presentation of an indication of a position uncertainty, the position uncertainty being based, at least in part, on the measure of potential hindrance.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
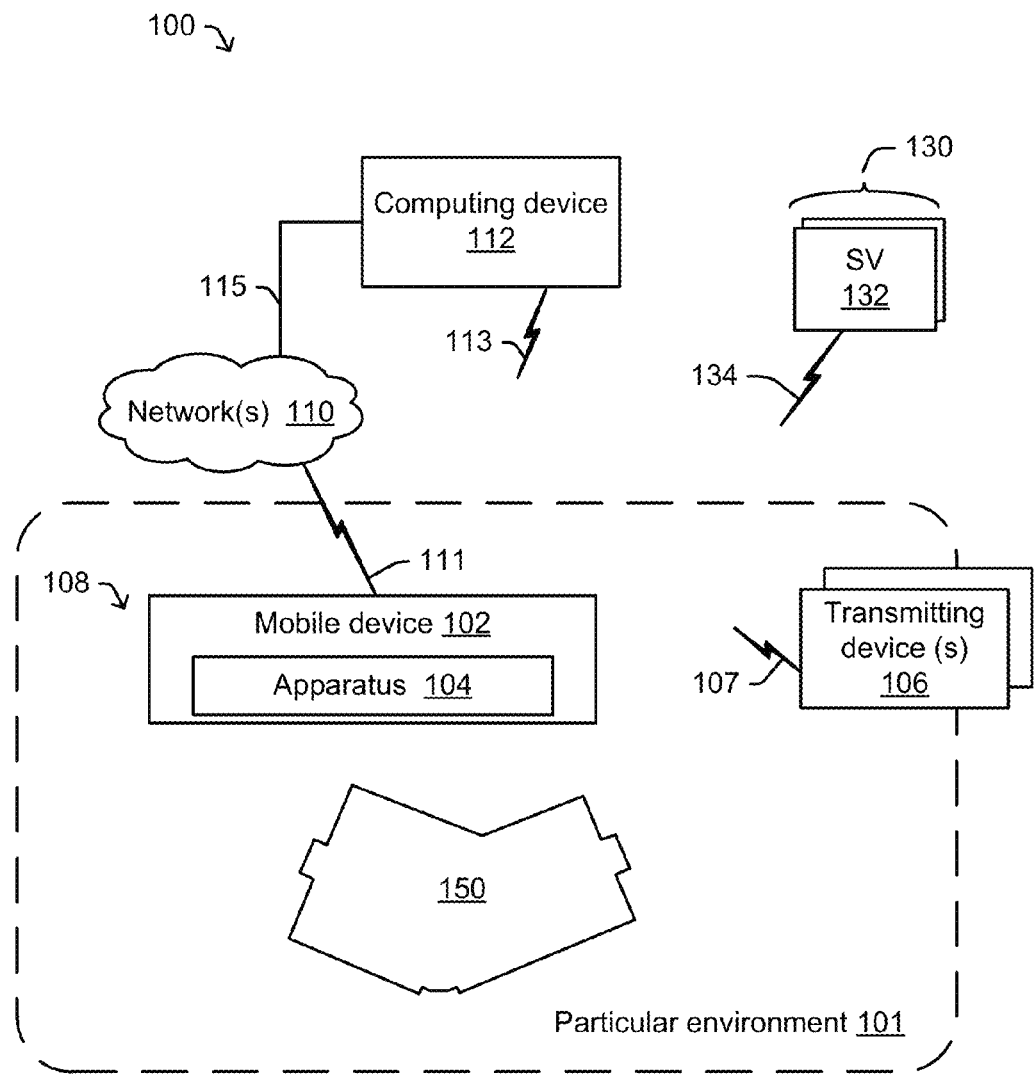
FIG. 1 is a schematic block diagram illustrating an example arrangement of representative electronic devices including an example mobile device that may be configured to identify a position uncertainty based, at least in part, on a measure of potential hindrance of an estimated trajectory, in accordance with certain example implementations.

Mobile devices may be configured, for example, to obtain all or part of a position fix and/or the like by measuring ranges to terrestrial transmitting devices (for example, wireless access points) which may be positioned at known and/or otherwise determinable locations. Such ranges may be measured, for example, by obtaining a MAC ID address from signals received from such access points and measuring one or more characteristics of signals received from such access points such as, for example, signal strength, round trip delay, just to name a few examples. Such measurements may be viewed as "direct measurements" in that they give information regarding a current position (such as a range to a transmitter fixed at a known position) when obtained.

Typically, measurements of ranges to three transmitters may be sufficient for obtaining a sufficiently accurate estimate of a position of the mobile device. In a particular example where measurements of ranges to more than three transmitters may be available, the accuracy of such an estimate may vary considerably based upon which particular measurements to which particular transmitting devices are selected for obtaining such an estimate of a position of a mobile device. For example, an inaccuracy in a range measurement to at least one transmitting device may in certain instances significantly degrade the accuracy of an estimate of a position of a mobile device computed based on the range measurement.

In addition to the use of direct measurements, certain mobile devices may incorporate "indirect measurements", which may be indicative of relative motion, to assist in obtaining an estimate of a current position estimate. Such indirect measurements may include, for example, measurements obtained from signals generated by one or more sensors such as, for example, accelerometers, pedometers, compasses, gyroscopes, and/or the like or some combination thereof. Also, in certain environments and applications, movement of a mobile device may be constrained by physical obstructions to predetermined areas or paths. In an indoor environment, for example, movement of a mobile device may be constrained to predetermined paths or routes defined according to walls, doorways, entrances, stairways, etc. As such, a current location of a mobile device may be presumed to be constrained by such predetermined areas or paths.

A motion model may process direct or indirect measurements to propagate an estimated state of a mobile device (e.g., position, velocity, trajectory, etc.). Such a motion model may comprise, for example, a filtering model such as a Kalman filter or particle filter to propagate estimated positions of a mobile device along one or more trajectories. In a particular implementation, a mobile device may employ a particle-filter over a constrained routing graph and/or the like to incorporate direct and indirect measurements subject to route constraints. For example, in certain instances, route constraints may indicate that particles may be propagated along a routing graph according to the particle state, and certain indirect information about relative position movement, each particle may be assigned a probability according to direct measurements, and/or particles may be resampled and/or otherwise process according to a probability distribution.

In certain instances, probabilities assigned to particular particles representing particular locations of an indoor area may comprise values indicative of a likelihood that a particular mobile device may be located at particular positions. For example, for a mobile device co-located with a user (e.g., a person, an animal, a machine) having just entered a particular doorway of a building and/or other like structure, a particle filter model and/or the like may assign higher probabilities to particles representing locations nearer to the doorway and relatively lower probabilities representing locations farther away from the doorway, for example, perhaps on the opposite side of the building from the doorway. Some particle filter models may, for example, assign probabilities to particular particles based on an estimated position and velocity of the mobile device. Unfortunately, an estimated velocity of a mobile device may be based on a series of measurements in the past. With a possibility for quick starts and stops, a velocity estimate computed based on a series of past measurements may, at times, prove stale or obsolete by the time the velocity estimate is computed.

As described in greater detail herein, in certain example implementations, a trajectory of a mobile device may be estimated which may nonetheless cross certain obstacles that may tend to hinder movement of a mobile device. For example, example techniques are described which may be used to identify a position uncertainty that may be based, at least in part, on a measure of potential hindrance of an estimated trajectory due to one or more obstacles that may be present within a particular environment.

As mentioned, in certain example implementations, a trajectory of a mobile device may, for example, be estimated based, at least in part, on one or more wireless signals received by the mobile device, for example, using various well known positioning techniques. Further, in certain example implementations, a trajectory of a mobile device may, for example, be estimated based, at least in part, on one or more signals from one or more sensors (e.g., inertial sensors, environmental sensors, etc.) provisioned on a mobile device, for example, using various well known positioning techniques. Further still, in certain example implementations, a trajectory of a mobile device may, for example, be estimated based, at least in part, on a combination of one of more wireless signal based positioning techniques and one or more sensor based positioning techniques. In certain example implementations, one or more such positioning techniques may be applied at various times or over various periods of time to estimate positions (e.g., coordinate positions, relative positions, etc.) of a mobile device and/or other parameters (e.g., a velocity, an acceleration, a heading or other like direction, an altitude, an elevation, etc.) that may correspond to one or more movements of the mobile device within a particular environment. As mentioned, in certain example implementations, all or part of a trajectory of a mobile device may be estimated and/or otherwise propagated using various well known filtering techniques, such as, for example, a particle filter (e.g., a sequential Monte Carlo (SMC) method, a Kalman filter, etc.).

In certain example implementations, an estimated trajectory of a mobile device may extend from one or more previously estimated or known positions (for example, a first position) towards one or more expected (estimated) positions (for example, a second position). It should be kept in mind that different portions of a trajectory may, in certain instances, correspond to different positions of a mobile device at different points in time. Thus, a trajectory may be indicative of one or more previously estimated or known positions, one or more current estimated or known positions, and/or one or more future (projected) estimated positions. Thus, a trajectory may, in certain instances, extend from a previous position (e.g., one or more previously estimated or known positions, one or more current estimated or known positions, etc.) towards an expected position (for example, one or more future estimated positions). In certain instances, a trajectory may, for example, represent a path of travel within a particular environment, which may comprise one or more straight sections, and/or one or more non-straight sections.

In certain instances, a trajectory may, for example, represent a path of travel that may be contiguous (for example, a linear function) or non-contiguous (for example, a discrete function) with respect to movements and/or time of the mobile device within a particular environment.

As described in greater detail herein, in certain instances a trajectory may correspond to a path of travel for which one or more obstacles may be indicated in or with regard to an electronic map (for example, one or more data files) as being present within a particular environment. Thus, for example, in certain instances a trajectory may correspond to a path of travel that crosses through a wall or other object corresponding to an electronic map. In certain example implementations, a mobile device may determine a measure of potential hindrance for at least a portion of a trajectory based, at least in part, on an electronic map that may be indicative of a presence or an absence of one or more obstacles within at least a portion of the path of travel indicated by the trajectory. In certain example implementations, a measure of potential hindrance may be determined based, at least in part, on the type(s) of obstacle(s) within at least a portion of the path of travel indicated by the trajectory. For example, in certain instances, a type of an obstacle may indicate that whether all or a portion of a wall or other like feature comprises an exterior wall (for example separating an indoor region from an outdoor region), an interior space-defining wall (e.g., partitioning certain spaces within an indoor region, such as, hallways, lobbies, office suites, machine rooms, etc.), an interior hallway-facing wall, or an interior space-dividing wall (e.g., possibly further dividing certain spaces within an indoor region into specific rooms, offices, storage spaces, etc.). In certain instances, an obstacle such as a wall or other like object may comprise a first portion that may be considered to represent a first type of obstacle and a second portion that may be considered to represent a second type of obstacle. For example, in certain instances a wall may be indicated as comprising a transition feature, such as, an opening (e.g., a doorway, an entryway, etc.) that a path of travel may transit through, a bend (e.g., a corner, a curve, a facet, etc.) that a path of travel may transit about/around, just to name a few examples. In certain example implementations, a first portion of such a wall that is relatively proximate to such a transition feature may be considered to represent a first type of obstacle, while a second portion of such a wall that is relatively distal to such a transition feature may be considered to represent a second type of obstacle.

In this example, it is assumed that an electronic map accurately represents a particular environment, and that a mobile device that may be moved (e.g., by a user, machine, etc.) within such environment would be hindered in some manner from adhering to a specific trajectory due to the presence of an obstacle in the actual environment. For example, a wall may be accurately represented in an electronic map which prevents movement of a mobile device along a particular trajectory that passes into or through the wall. Thus, a measure of position uncertainty may be different (for example, greater) in the presence of one or more obstacles within at least a portion of a trajectory than in an absence of such obstacle(s) within such a portion of the trajectory. Further, as may be appreciated, in certain instances a measure of potential hindrance for a trajectory that crosses or otherwise encounters a first type of obstacle (e.g., an interior space-dividing wall, a portion of a wall relatively proximate to a transition feature, an object indicated as a non-fixed non-structural feature, etc.) may be different (for example, lower) than a measure of potential hindrance for a trajectory that crosses or otherwise encounters a second type of obstacle (e.g., an exterior wall, an interior space-dividing wall, a portion of a wall relatively distal to a transition feature, an object indicated as a structural feature, an object indicated as a fixed non-structural feature, etc.). Further still, in certain instances a measure of potential hindrance may be determined based, at least in part, on a number of obstacle(s) (e.g., of certain types, and/or of all types) within at least a portion of a trajectory. For example, in certain instances a measure of potential hindrance for a trajectory that crosses or otherwise encounters one obstacle may be different than a measure of potential hindrance for a trajectory that crosses or otherwise encounters a plurality of obstacles. In certain example implementations, a weighting scheme or the like may be applied to further differentiate and/or otherwise take into consideration various levels of potential hindrance that different obstacles and/or types of obstacles may represent. For example, a weighting scheme may be used to indicate that an exterior wall may affect a measure of potential hindrance more than might an interior space-defining wall and/or an interior space-dividing wall. Additionally, such a weighting scheme may, for example, be used to indicate that an interior space-defining wall may affect a measure of potential hindrance more than might an interior space-dividing wall. In a similar manner, a weighting scheme may, for example, be used to indicate that a first portion of an obstacle may affect a measure of potential hindrance more than might one or more other portions of an obstacle.

In certain example implementations, a measure of potential hindrance may affect and/or correspond to a position uncertainty for a mobile device corresponding to a trajectory. As such, in certain instances, a mobile device may present, in some manner, an indication of a position uncertainty to a user of the mobile device, wherein the position uncertainty may be based, at least in part, on a determined measure of potential hindrance. By way of an example, an indication of a position uncertainty may comprise a graphical presentation that may be visibly indicative of a measure of potential hindrance at a particular point in time and/or for all or part of a trajectory. In certain instances, such an indication of position uncertainty may be altered in some manner in response to a change in a measure of potential hindrance. For example, in certain implementations an indication of position uncertainty may be represented, at least in part, using an alterable two-dimensional shape scheme, an alterable color scheme, an alterable pattern scheme, and/or the like or some combination thereof that may be presented to a user via a user interface mechanism (for example, a display screen). For example, in certain implementations an indication of position uncertainty may be represented, at least in part, using an alterable sound presentation scheme that may be presented to a user audibly via a user interface mechanism (e.g., a speaker, a headset, a transducer). For example, in certain implementations an indication of position uncertainty may be represented, at least in part, using an alterable tactical presentation scheme that may be presented tactilely to a user via a user interface mechanism (for example, a vibrating device).

As described in greater detail herein, in certain example implementations, techniques may be applied at a mobile device and/or at one or more other electronic devices to identify one or more obstacles within a particular environment that may at times represent a potential hindrance to movement of a mobile device. For example, certain example techniques are described that may be applied to identify such an obstacle based, at least in part, on a schematic or and/or other like representation of layout of an indoor region, for example, as may be provided in or with respect to an electronic map. In certain example implementations, a mobile device may receive all or part of one or more data files indicative of at least one or more obstacles from one or more other electronic devices. For example, a mobile device may obtain a data file that comprises an electronic map that may be expressly and/or inherently indicative of an obstacle. In certain instances, a mobile device may obtain one or more other data files corresponding to an electronic map, e.g., comprising meta data, assistance data, and/or the like that may be indicative of an obstacle.

Attention is drawn next to FIG. 1, which is a schematic block diagram illustrating an example arrangement 100 of representative electronic devices including an example mobile device 102 comprising an example apparatus 104, one or more of which may be configured to identify a position uncertainty based, at least in part, on a measure of potential hindrance of an estimated trajectory, in accordance with certain example implementations.

Mobile device 102 may, for example, comprise a portable computing device, portable communication device, a portable tracking/location device, and/or the like or some combination thereof. Hence, in certain instances, mobile device 102 may comprise a cellular telephone, a smart phone, a laptop computer, a tablet computer, a navigation device, a wearable computer, a tracking mechanism, just to name a few examples.

As illustrated mobile device 102 may receive wireless signals over a communication link 111 from one or more networks 110, which may be further coupled to one or more other devices 116 via communication link 117. In certain implementations, network(s) 110 may be representative of one or more wireless communication systems, one or more cellular communication systems, one or more wired communication systems, one or more computer networks, all or part of the Internet, an intranet, a local area network, and/or various other computing and/or communication resources/devices/services.

Mobile device 102 may receive wireless signals over communication link 107 from one or more transmitting devices 106, one or more of which may be further coupled together and/or to network(s) 110 (connection not shown). Transmitting device(s) 106 may be representative of variety of different transmitting devices and/or transmitting/receiving devices that may transmit and/or receive wireless signals. In certain implementations, transmitting device(s) 106 may comprise one or more transmitting devices that may be part of or otherwise support network(s) 110 or some portion thereof. Hence, for example, transmitting device(s) 106 may represent a cellular base station, a femtocell device, a pico cell device, a WLAN access point device, a location Beacon device, and/or the like or some combination thereof, just to name a few examples. Indeed, in certain instances, transmitting device(s) 106 may represent one or more other mobile devices. In accordance with certain aspects, transmitting device(s) 106 may represent any electronic device that may transmit and/or receive wireless signals in support of various computing, communication, location, and/or other like services/capabilities provided or otherwise supported by mobile device 102. As illustrated, one or more transmitting devices 106 may be located within a particular environment 101, and/or otherwise operatively arranged to serve all or part of particular environment 101.

In certain implementations, as shown in FIG. 1, a mobile device 102 may receive or acquire SPS signals 134 from one or more space vehicles (SVs) 132, which may be part of one or more SPS 130. In some embodiments, SPS 130 may be from one global navigation satellite system (GNSS), such as the GPS or Galileo satellite systems. In other embodiments, the SVs 132 may be from multiple GNSS such as, but not limited to, GPS, Galileo, Glonass, or Beidou (Compass) satellite systems. In other embodiments, the SVs 132 may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In particular implementations, mobile device 102 may have circuitry and processing resources capable of computing a position fix (for example, a "known" position or estimated position of mobile device 102. For example, mobile device 102 may compute a position fix based, at least in part, on pseudorange measurements to one or more or more the SVs 132. Here, mobile device 102 may compute such pseudorange measurements based, at least in part, on pseudonoise code phase detections in SPS signals 134 acquired from four or more SVs 132. In particular implementations, mobile device 102 may receive from positioning assistance data and/or the like from a server (for example, represented by computing device 112) which may be used to aid in the acquisition of SPS signals 134 including, for example, almanac, ephemeris data, Doppler search windows, just to name a few examples. In certain implementations, similar other types of positioning assistance data may be obtained by mobile device 102 from one or more other devices with regard to one or more transmitting device(s) 106.

In certain example implementations, mobile device 102 may obtain a position fix by processing signals received from terrestrial transmitting device(s) 106 (one or more of which may have fixed and/or otherwise determinable locations) using any one of several techniques such as, for example, advanced forward trilateration (AFLT) and/or OTDOA. In these particular example techniques, a range from mobile device 102 may be measured to one or more or more of such terrestrial transmitters fixed at known locations based, at least in part, on pilot signals transmitted by the transmitting device(s) 106 from fixed otherwise determinable locations and received at mobile device 102. In certain example stations, as mentioned, computing device 112 may be capable of providing certain types of positioning assistance data to mobile device 102. By way of example, certain types of positioning assistance data may be indicative of locations and identities of terrestrial transmitting devices, which may facilitate positioning techniques such as AFLT and OTDOA. For example, a server may provide all or part of a base station almanac (BSA) and/or the like, which may be indicative of locations and identities of cellular base stations, etc., in a particular region or regions.

In particular environments such as indoor environments or urban canyons, mobile device 102 may not be capable of adequately acquiring SPS signals 134 from a sufficient number of SVs 132 and/or two perform AFLT or OTDOA to compute a position fix from acquisition of signals from applicable outdoor terrestrial transmitting devices. Hence, in certain instances, mobile device 102 may be capable of computing a position fix based, at least in part, on wireless signals acquired from other transmitting devices, e.g., local/indoor transmitting devices (e.g., WLAN access points, femto cell transceivers, Bluetooth devices, etc., which may be positioned at known or otherwise determinable locations). Accordingly, in certain implementations, mobile device 102 may obtain all or part of a position fix by measuring ranges to one or more indoor terrestrial wireless access point devices and/like. Such ranges may be measured, for example, by obtaining a MAC ID address from wireless signals received from such a transmitting device and obtaining range measurements to the transmitting device (e.g., at least in part, by measuring one or more characteristics of the received signals). By way of example, in certain implementations a received signal strength (RSSI), a round trip time (RTT), an angle of arrival (AOA), and/or the like or some combination thereof may be determined/considered. In certain implementations, mobile device 102 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address and/or some other distinctly unique identifier which may be discernible from a signal acquired from a local transmitter), expected RSSI from signals transmitted by the identified local transmitting devices, an expected RTT from the identified transmitting devices, and possibly standard deviations from these expected RSSI or RTT. It should be understood, however, that these are merely examples of values that may be stored in, modeled, and/or otherwise functionally/mathematically represented by a radio heatmap and/or the like, and that claimed subject matter is not limited in this respect.

In addition to measurements obtained from the acquisition of wireless signals from local transmitting devices, according to a particular embodiment, mobile device 102 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating all or part of a position and/or a motion state of mobile device 102.

Arrangement 100 further includes example computing device 112, which may communicate with mobile device 102, e.g., via communication link 115, network(s) 110, and communication link 111, or possibly in a more direct manner as represented by indication link 113. While illustrated as being outside of particular environment 101, it should be understood that all or part of computing device 112 and/or network(s) 110 may be provisioned within a particular environment 101.

Figure 4:
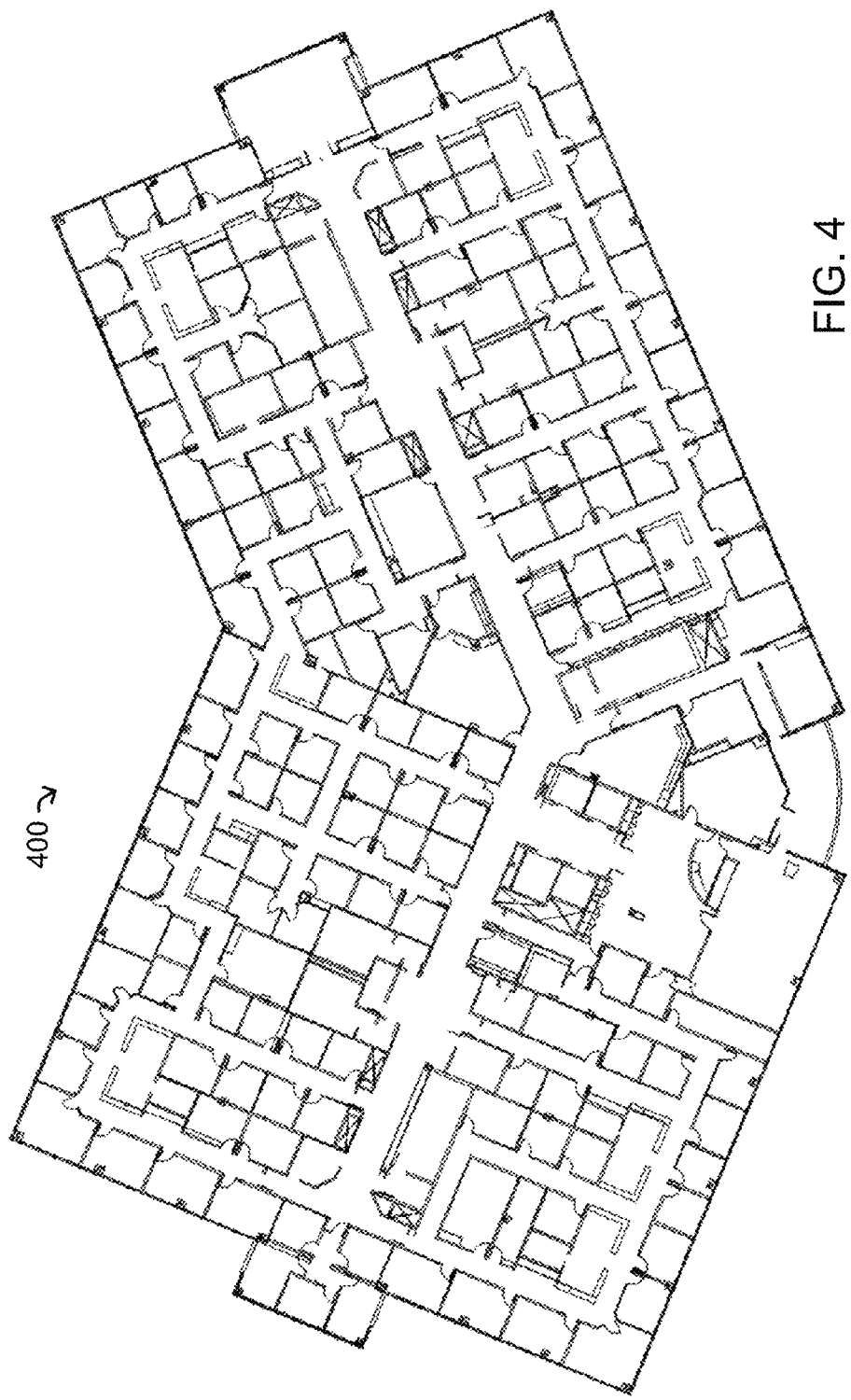
FIG. 4 is a schematic diagram illustrating a floor plan of an example structure within a particular environment, in which a mobile device may be provided and moved about, and which may comprise one or more obstacles that may affect a measure of potential hindrance of certain estimated trajectories of the mobile device, in accordance with an example implementation.

As shown in FIG. 1, certain instances a particular environment 101 may comprise all or part of one or more structures having one or more regions therein through which and/or within which a mobile device may be moved/positioned. By way of example, an outline of a floor plan 150 is illustrated for a portion of a building having various regions, with various obstacles that may affect movement and/or positioning of a mobile device in some manner. FIG. 4 presents a more detailed illustration of an example internal floor plan. Although illustrated as single floor, it should be kept in mind that the techniques provided herein are not necessarily limited to a single floor or any specific region that may be provided by one or more structures within a particular environment.

Figure 2A:
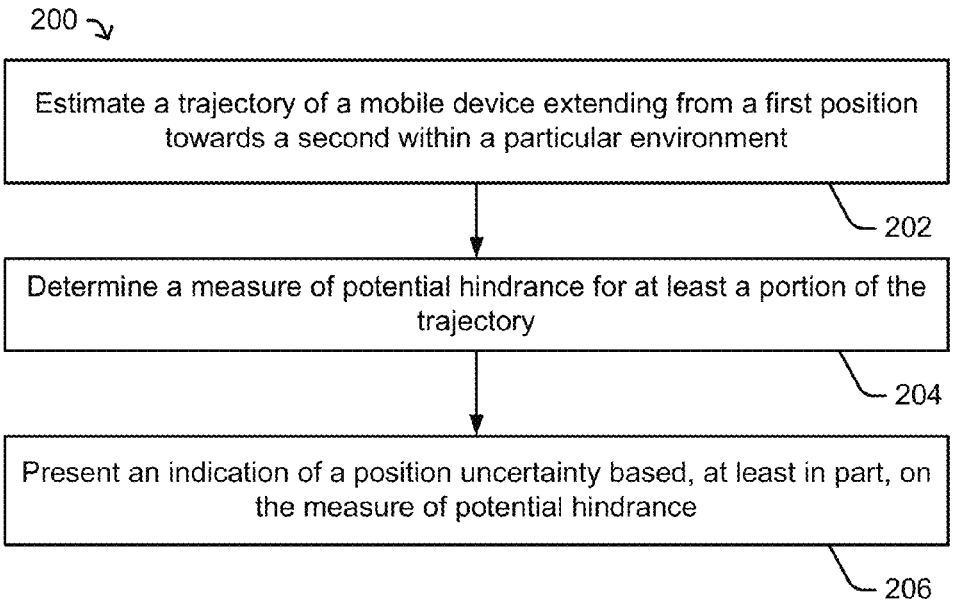
FIG. 2A and FIG. 2B are flow diagrams illustrating some example processes that may be implemented in a mobile device, for example, as in FIG. 1, to identify a position uncertainty based, at least in part, on a measure of potential hindrance of an estimated trajectory, in accordance with certain example implementations.

Attention is drawn next to FIG. 2A, which is a flow diagram illustrating an example process 200 that may be implemented mobile device 102 and/or apparatus 104 (FIG. 1), to identify a position uncertainty based, at least in part, on a measure of potential hindrance of an estimated trajectory, in accordance with certain example implementations.

At example block 202, a trajectory of a mobile device within a particular environment may be estimated. The trajectory may extend from a first position towards a second position, wherein the first position may, for example, be known or estimated, and the second position may, for example, be estimated. Thus, as mentioned, in certain instances, such a trajectory may extend from a previous estimated position towards an expected estimated position. In certain instances, a particular environment may comprise all or part of an indoor region, At example block 204, a measure of potential hindrance for at least a portion of the trajectory may be determined. By way of example, in certain implementations, a measure of potential hindrance may be determined based, at least in part, on an electronic map (and/or other corresponding or like data files) that may be indicative of a presence or an absence of one or more obstacles within a particular environment corresponding at least a portion of the trajectory. In certain instances, a type and/or number of such obstacles (if present) may affect a measure of potential hindrance.

Figure 7:
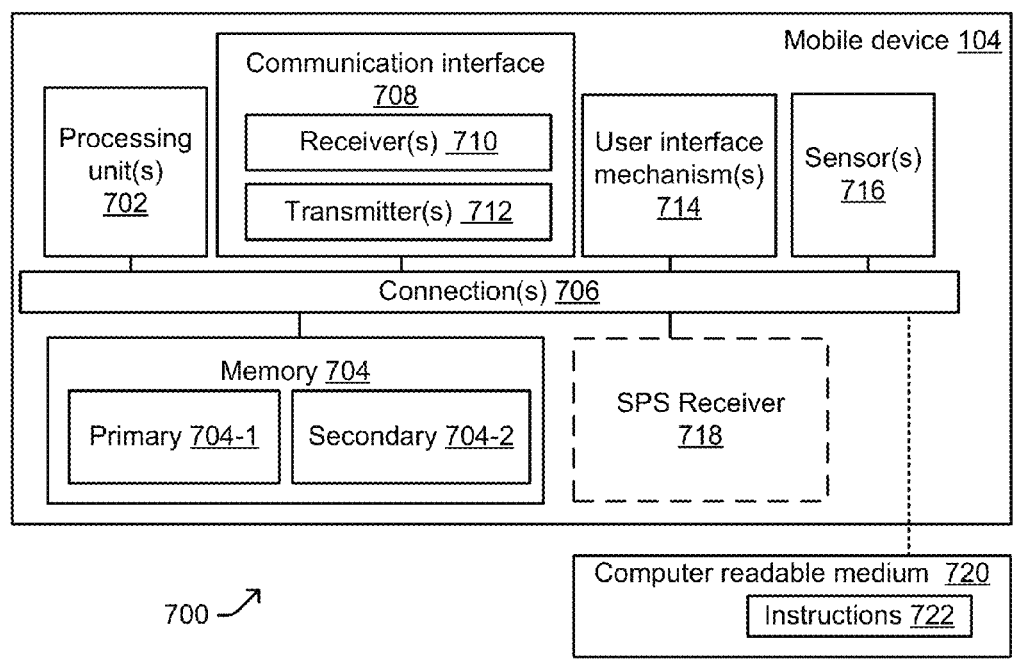
FIG. 7 is a schematic diagram illustrating certain features of an example computing platform that may be provisioned within a mobile device, for example, as in FIG. 1, in accordance with certain example implementations.

At example block 206, an indication of a position uncertainty may be presented, for example, to a user via one or more user interface mechanisms (see, for example, FIG. 7). By way of example, in certain instances a position uncertainty may be based, at least in part, on a measure of potential hindrance, for example, from block 204. In certain instances, such an indication of a position uncertainty may be presented, at least in part, through various types of outputs (e.g., visual, audible, tactile, or some combination thereof) that a user of the mobile device may comprehend.

Figure 2B:
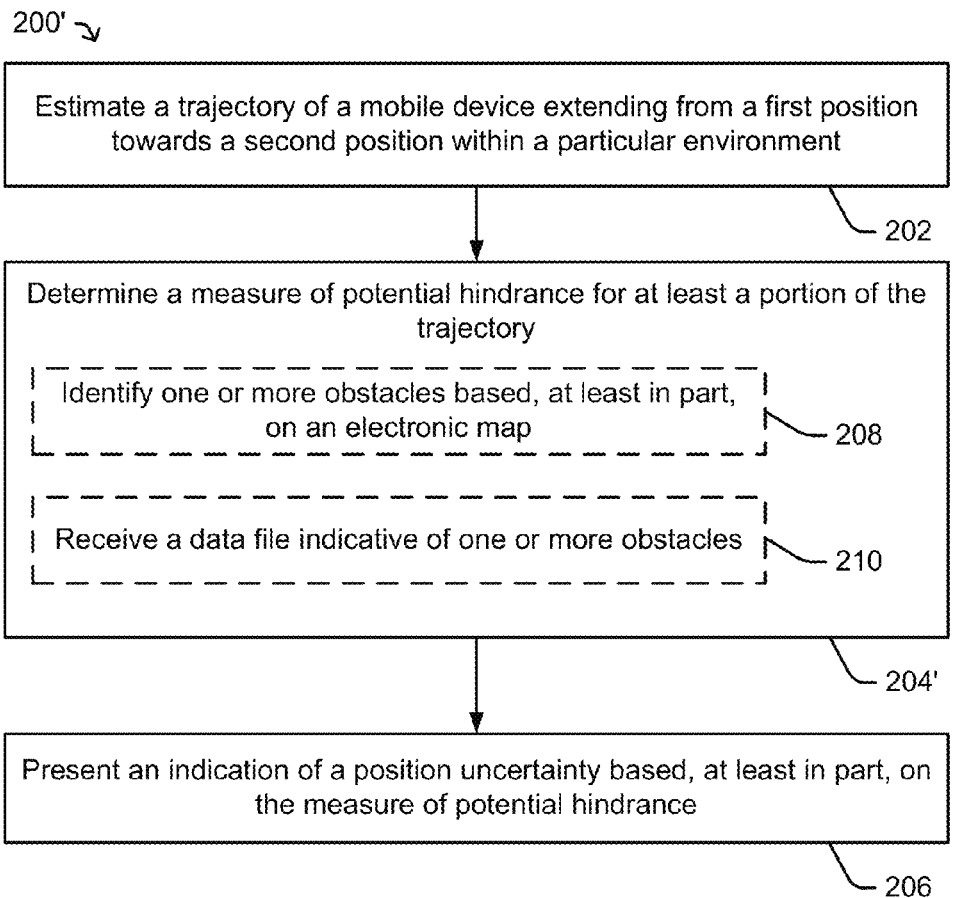

Attention is drawn next to FIG. 2B, which is a flow diagram illustrating an example process 200' that may be implemented mobile device 102 and/or apparatus 104 (FIG. 1), to identify a position uncertainty based, at least in part, on a measure of potential hindrance of an estimated trajectory, in accordance with certain example implementations.

At example block 202, a trajectory of a mobile device within a particular environment may be estimated. As mentioned, in certain instances, such a trajectory may extend from a first (for example, previous estimated or known) position towards a second (an expected estimated) position.

Figure 5:
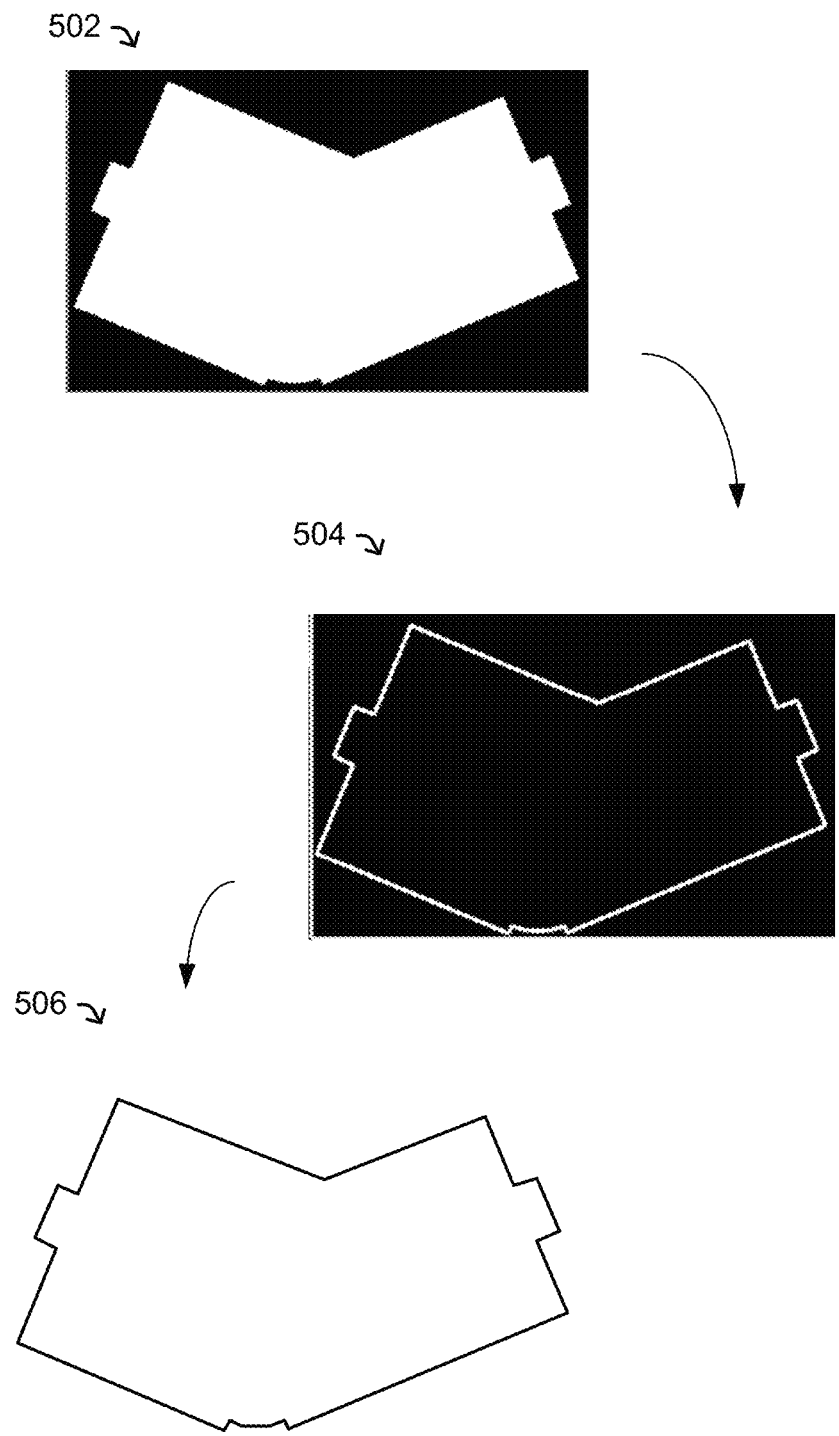
FIG. 5 and FIG. 6 are illustrated process flows corresponding to the example floor plan of FIG. 4, in which certain particular types of obstacles that may affect a measure of potential hindrance of certain estimated trajectories of the mobile device may be identified, in accordance with an example implementation.
Figure 6:
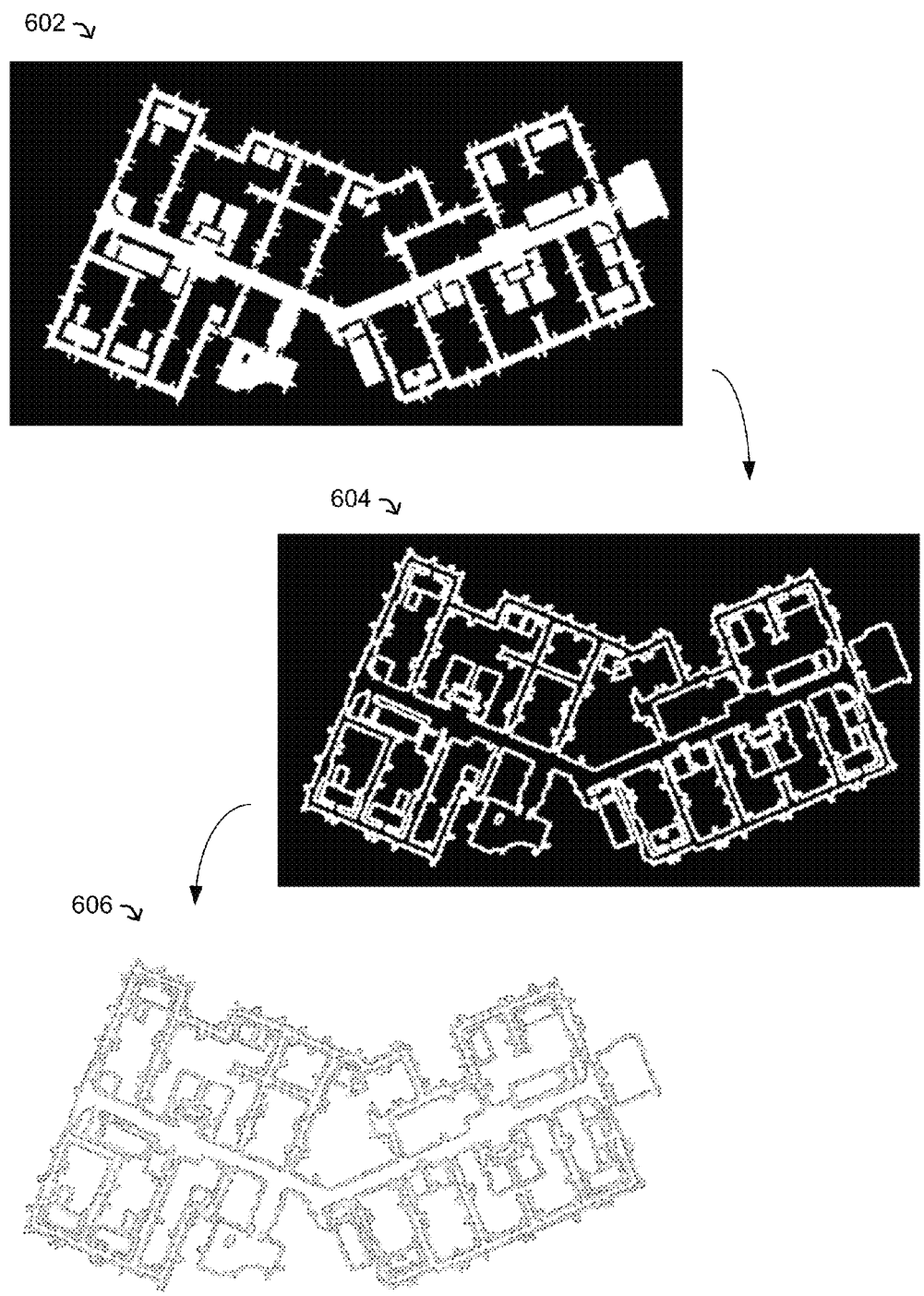

At example block 204', a measure of potential hindrance for at least a portion of the trajectory may be determined. For example, a measure of potential hindrance for at least a portion of the trajectory may be determined based, at least in part, on an electronic map (and/or other corresponding or like data files) that is indicative of a presence or an absence of one or more obstacles within a particular environment corresponding at least a portion of the trajectory. In certain instances, a type and/or number of such obstacles (if present) may affect a measure of potential hindrance. In certain instances, at example block 208, a mobile device may identify one or more obstacles, e.g., based, at least in part, on an electronic map and/or other corresponding or like data files. One or more of such identified obstacles may be used (for example, at block 204') to determine a measure of potential hindrance for at least a portion of the trajectory. Some non-limiting example techniques that may be used, at least in part, to identify one or more obstacles are illustrated in FIGS. 4-6. In certain implementations, at example block 210, a data file may be received by a mobile device which may be indicative of one or more obstacles. Thus, for example, in certain implementations, all or part of the acts of block 208 and/or the like may be performed by one or more other electronic devices (for example, computing device 112 in FIG. 1), and all or part of the completed or partially completed results may be transmitted to the mobile device (and received, for example, at block 210) for use and/or further processing by the mobile device.

At example block 206, an indication of a position uncertainty may be presented, for example, to a user via one or more user interface mechanisms (see, for example, FIG. 7). As mentioned, in certain instances a position uncertainty may be based, at least in part, on a measure of potential hindrance. Again, in certain instances, such an indication of a position uncertainty may be presented, at least in part, through various types of outputs (e.g., visual, audible, tactile, or some combination thereof) that a user of the mobile device may comprehend.

Attention is drawn next to FIG. 3A, FIG. 3B, FIG. 3C, and FIG. 3D, which are schematic diagrams illustrating certain features of a particular environment and some example identified position uncertainties that may be based, at least in part, on various measures of potential hindrance of certain estimated trajectories of a mobile device, in accordance with certain example implementations.

FIG. 3A, FIG. 3B, FIG. 3C, and FIG. 3D show similar portions 300-1, 300-2, 300-3, and 300-4, respectively, of an environment in which part of a structure comprises an external wall 302 having a transition feature (for example, represented here by an opening 304), an internal wall 306 having a transition feature (for example, represented here by an opening 308) and defining a space 310, and another obstacle (for example, represented here by object 307).

Figure 3:
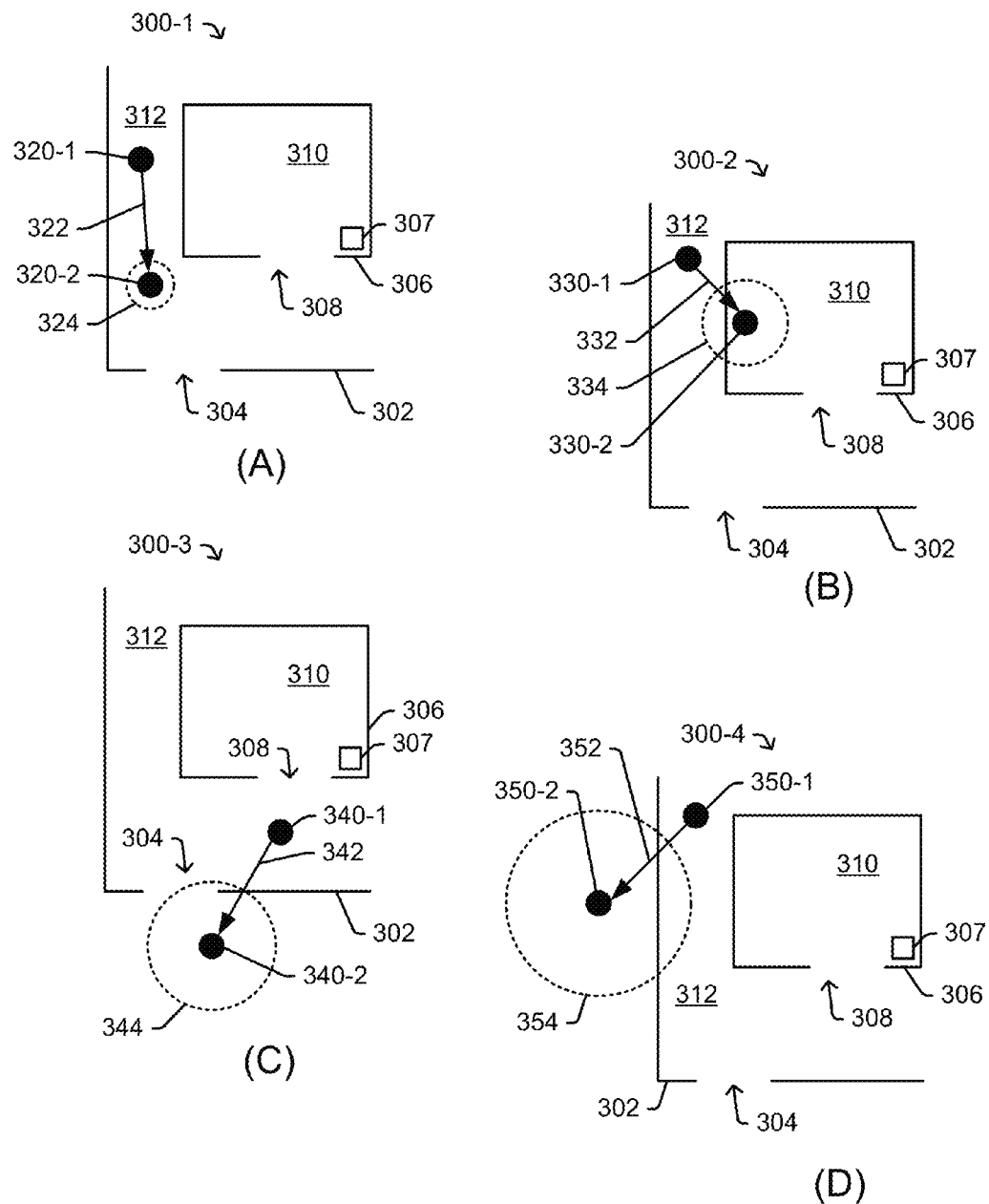
FIG. 3A, FIG. 3B, FIG. 3C, and FIG. 3D are schematic diagrams illustrating certain features of a particular environment and some example identified position uncertainties that may be based, at least in part, on various measures of potential hindrance of certain estimated trajectories of a mobile device, in accordance with certain example implementations.

In FIG. 3A, a trajectory 322 is illustrated extending from a first position 320-1 towards a second position 320-2. As shown in this example, there is an absence of obstacles with regard to trajectory 322. Accordingly a measure of potential hindrance may be affected accordingly (e.g., reduced, minimalized, etc.). Hence, an indication of a position uncertainty may be illustrated (and possibly visually presented) by way of an indicator 324, which in this example may correspond to a relatively accurate position fix, etc. In certain instances, indicator 324 may correspond to a default position uncertainty or a current position uncertainty (for example, corresponding to the positioning technique(s) being employed).

In FIG. 3B, a trajectory 332 is illustrated extending from a first position 330-1 towards a second position 330-2. As shown in this example, there is at least one obstacle with regard to trajectory 332 (i.e., a portion of wall 306). Accordingly, since a position uncertainty may be based, at least in part, on a measure of potential hindrance, an indicator of a position uncertainty may be affected by changes in the measure of potential hindrance. Thus, in certain example implementations, a position uncertainty may increase or decrease based on an increase or a decrease, respectively, in a measure of potential hindrance. Here, in FIG. 3B, an increase in a measure of potential hindrance may increase the position uncertainty, for example, compared to that represented by indicator 324 of FIG. 3A. Hence, an indication of a position uncertainty may be illustrated (and possibly visually presented) by way of an indicator 334, which in this example may correspond to a reasonably accurate position fix, etc., but which may also indicate such accuracy and/or uncertainty to a user.

In FIG. 3C, a trajectory 342 is illustrated extending from a first position 340-1 towards a second position 340-2. As shown in this example, there is at least one obstacle with regard to trajectory 342 (for example, a portion of wall 302). Accordingly a measure of potential hindrance may be affected (for example, increased), which may increase a position uncertainty, for example, compared to that represented by indicator 324 of FIG. 3A, or indicator 334 of FIG. 3B. Hence, an indication of a position uncertainty may be illustrated (and possibly visually presented) by way of an indicator 344, which in this example may correspond to a less accurate position fix, etc., but which may also indicate such accuracy and/or uncertainty to a user.

In FIG. 3D, a trajectory 352 is illustrated extending from a first position 350-1 towards a second position 350-2. As shown in this example, there is at least one obstacle with regard to trajectory 352 (for example, a portion of wall 302). Accordingly a measure of potential hindrance may be affected (for example, increased), which may increase a position uncertainty, for example, compared to that represented by indicator 324 of FIG. 3A, or indicator 334 of FIG. 3B. Hence, an indication of a position uncertainty may be illustrated (and possibly visually presented) by way of an indicator 354, which in this example may correspond to a less accurate position fix, etc., but which may also indicate such accuracy and/or uncertainty to a user. Notice that indicator 354 presents an increase position uncertainty when compared to indicator 344 of FIG. 3C. As previously mentioned, in certain instances, different portions of an obstacle (here, for example, wall 302) may be identified as different types of obstacles. Thus, a position uncertainty may be greater in FIG. 3D than in FIG. 3C, since trajectory 352 crosses wall 302 further away from transition feature 304 than does trajectory 342 of FIG. 3C.

Although some of the examples presented herein illustrate certain types of walls or portions thereof as representing obstacles, it should be understood that the techniques provided herein may be applied to a wide variety of obstacles. For example, an electronic map or the like corresponding to an indoor environment may be indicative of not only walls, but other features that may affect movement/navigation therein, and hence may represent an obstacle in accordance with certain techniques provided herein. By way of some non-limiting examples, an obstacle may correspond all or part of one or more features, such as, a staircase, an elevator, an escalator, a support structure, a door, a gate, a curtain, a divider, one or more pieces of fixed or movable furniture, a fixed or movable object (e.g., a sculpture, a fountain, a tree, a stage, etc.), and/or the like or some combination thereof. Of course, claimed subject matter is not necessarily intended to be so limited.

In certain example implementations a severity of an error, for example, corresponding to crossing a wall or other obstacle, may take into consideration an attendant routable distance or other like measure of the trajectory. In certain instances, type(s) of walls may be considered. For example, crossing an exterior wall or the like may have a higher penalty than an interior wall or the like. In certain instances, crossing a wall facing a walk way or hall way may be less severe than crossing a wall that separates two rooms which have larger routing distances. In certain instances, an obstacle may, for example, comprises a wall, wherein a first portion of the wall may comprise a first type of obstacle and a second portion of the wall may comprise a second type of obstacle. For example, a first portion of a wall may be closer in distance to a transition feature of the wall than a second portion of the wall.

Attention is drawn next to FIG. 4, which is a schematic diagram illustrating a floor plan 400 of an example structure within a particular environment. As shown, floor plan 400 is indicative a plurality of internal spaces defined by a plurality of obstacles (e.g., various different types of walls, etc.).

FIG. 5 and FIG. 6 are illustrated process flows corresponding to the example floor plan 400, in which certain particular types of obstacles that may affect a measure of potential hindrance of certain estimated trajectories of the mobile device may be identified, in accordance with an example implementation. At example stage 502, an indoor region may be identified, for example, using known techniques that may detect an external edge of the structure shown in floor plan 400. At example stage 504, an indoor boundary may be extracted to indicate external walls and/or the like, which are illustrated at stage 506. At example stage 602, obstacles corresponding to certain internal spaces (e.g., hallways, open spaces, etc.) may be identified, e.g., using known techniques that may detect edges of walls defining particularly sized spaces, etc., within the internal structure shown in floor plan 400. At stage 604, certain types of internal walls, for example, walls and transition features (here, doors) that are facing hallways, may be identified, which are illustrated at stage 606.

As may be appreciated various different types of obstacles may be identified through such detection/subtraction image or line processing techniques, and/or via other known techniques. In the example above, all of part of the remaining internal walls of floor plan 400, for example, not already identified and possibly classified via the example process flows of FIGS. 5 and 6 may be identified and possibly classified as certain types of internal walls, etc.

FIG. 7 is a schematic diagram illustrating certain features of an example special purpose computing platform 700 that may be provided within mobile device 102 and/or apparatus 104 (FIG. 1) according to the various techniques provided herein.

As illustrated special purpose computing platform 700 may comprise one or more processing units 702 (for example, to perform data processing in accordance with certain techniques provided herein) coupled to memory 704 via one or more connections 706 (e.g., one or more electrical conductors, one or more electrically conductive paths, one or more buses, one or more fiber-optic paths, one or more circuits, one or more buffers, one or more transmitters, one or more receivers, etc.). Processing unit(s) 702 may, for example, be implemented in hardware or a combination of hardware and software. Processing unit(s) 702 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 704 may be representative of any data storage mechanism. Memory 704 may include, for example, a primary memory 704-1 and/or a secondary memory 704-2. Primary memory 704-1 may comprise, for example, a random access memory, read only memory, etc. While illustrated in this example as being separate from the processing units, it should be understood that all or part of a primary memory may be provided within or otherwise co-located and coupled with processing unit 702 or other like circuitry within mobile device 102. Secondary memory 704-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 720. Memory 704 and/or non-transitory computer readable medium 720 may comprise instructions 722 for use in performing data processing, for example, in accordance with the applicable techniques as provided herein.

Special purpose computing platform 700 may, for example, further comprise a communication interface 708. Communication interface 708 may, for example, comprise one or more wired and/or wireless network interface units, radios, modems, etc., represented here by one or more receivers 710 and one or more transmitters 712. It should be understood that in certain implementations, communication interface 708 may comprise one or more transceivers, and/or the like. Further, it should be understood that although not shown, communication interface 708 may comprise one or more antennas and/or other circuitry as may be applicable given the communication interface capability.

In accordance with certain example implementations, communication interface 708 may, for example, be enabled for use with various wired communication networks, e.g., such as telephone system, a local area network, a wide area network, a personal area network, an intranet, the Internet, etc.

In accordance with certain example implementations communication interface 708 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (for example, "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

In accordance with certain example implementations, communication interface 708 may, for example, be enabled for use with various wired communication networks, e.g., such as telephone system, a local area network, a wide area network, a personal area network, an intranet, the Internet, etc.

Mobile device 102 may, for example, further comprise one or more user interface mechanisms 714. User interface mechanisms 714 may represent one or more devices or other like mechanisms that may be used to obtain inputs from and/or provide outputs to one or more other devices and/or a user. Thus, for example, user interface mechanisms 714 may comprise various buttons, switches, a touch pad, a trackball, a joystick, a touch screen, a keyboard, a microphone, a camera, and/or the like, which may be used to receive one or more user inputs. In certain instances, user interface mechanisms 714 may comprise various devices that may be used in producing a visual output, an audible output, and/or a tactile output for a user. For example, user interface mechanisms 714 may be used to present a video display, graphical user interface, positioning and/or navigation related information, visual representations of electronic map, routing directions, etc., via a display mechanism and/or audio mechanism.

Mobile device 102 may, for example, comprise one or more sensors 716. For example, sensor(s) 716 may represent one or more environmental sensors, such as, e.g., a magnetometer or compass, a barometer or altimeter, etc., and which may be useful for positioning and/or determining a motion state. For example, sensor(s) 716 may represent one or more inertial sensors, which may be useful in detecting certain movements of mobile device 102. Thus for example, sensor(s) 716 may comprise one or more accelerometers, one or one or more gyroscopes. Further, in certain instances sensor(s) 716 may comprise and/or take the form of one or more input devices such as a sound transducer, a microphone, a camera, a light sensor, etc.

SPS receiver 718 may be capable of acquiring and acquiring SPS signals 134 via one or more antennas (not shown). SPS receiver 718 may also process, in whole or in part, acquired SPS signals 134 for estimating a position and/or a motion of mobile device 102. In certain instances, SPS receiver 718 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated position of mobile device 102. In certain implementations, all or part of such processing of acquired SPS signals may be performed by other processing capabilities in mobile device 102, e.g., processing unit(s) 702, memory 704, etc., in conjunction with SPS receiver 718. Storage of SPS or other signals for use in performing positioning operations may be performed in memory 704 or registers (not shown).

In certain instances, sensor(s) 716 may generate analog or digital signals that may be stored in memory 704 and processed by DPS(s) (not shown) or processing unit(s) 702 in support of one or more applications such as, for example, applications directed to positioning or navigation operations based, at least in part, on one or more positioning functions.

Processing unit(s) 702 may comprise a dedicated modem processor or the like that may be capable of performing baseband processing of signals acquired and down converted at receiver(s) 710 of communication interface 708 or SPS receiver 718. Similarly, a modem processor or the like may perform baseband processing of signals to be up converted for transmission by (wireless) transmitter(s) 712. In alternative implementations, instead of having a dedicated modem processor, baseband processing may be performed by a general purpose processor or DSP (for example, general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
   estimating a trajectory of said mobile device within a particular environment comprising an indoor region, said trajectory extending from a first position towards a second position;
   determining a measure of potential hindrance for at least a portion of said trajectory based, at least in part, on an electronic map that is indicative of a presence or an absence of one or more obstacles within at least said portion of said trajectory; and
   presenting an indication of a position uncertainty to a user of said mobile device, said position uncertainty being based, at least in part, on said measure of potential hindrance, wherein said indication of said position uncertainty indicates an increased position uncertainty responsive to a higher measure of potential hindrance for said at least a portion of said trajectory and said indication of said position uncertainty indicates a decreased position uncertainty responsive to a lower measure of potential hindrance.

2. The method as recited in claim 1, wherein said electronic map is indicative of said presence of said one or more obstacles within at least said portion of said trajectory, and said measure of potential hindrance is determined based, at least in part, on a type of at least one of said one or more obstacles.

3. The method as recited in claim 2, wherein said type of said one or more obstacles comprises: an exterior wall, an interior space-defining wall, an interior hallway-facing wall, or an interior space-dividing wall.

4. The method as recited in claim 2, wherein at least one of said one or more obstacles comprises a wall, and wherein a first portion of said wall comprises a first type of obstacle and a second portion of said wall comprises a second type of obstacle.

5. The method as recited in claim 4, wherein said first portion of said wall is closer in distance to a transition feature of said wall than is said second portion of said wall.

6. The method as recited in claim 2, wherein at least one of said one or more obstacles comprises: a structural feature, a fixed non-structural feature, or a non-fixed non-structural feature.

7. The method as recited in claim 1, wherein said electronic map is indicative of a presence of said one or more obstacles within at least said portion of said trajectory, and said measure of potential hindrance is determined based, at least in part, on a number of said one or more obstacles within at least said portion of said trajectory.

8. The method as recited in claim 1, wherein said indication of said position uncertainty comprises a graphical presentation that is visibly indicative of said position uncertainty.

9. The method as recited in claim 1, wherein said indication of said position uncertainty comprises a sound presentation that is audibly indicative of said position uncertainty.

10. The method as recited in claim 1, and further comprising, at said mobile device, identifying at least one of said one or more obstacles based, at least in part, on said electronic map.

11. The method as recited in claim 1, and further comprising, at said mobile device, receiving a data file indicative of at least one of said one or more obstacles.

12. A mobile device comprising:
   a user interface mechanism; and
   a processing unit coupled to said user interface mechanism and configured to:

estimate a trajectory of said mobile device within a particular environment comprising an indoor region, said trajectory extending from a first position towards a second position;

determine a measure of potential hindrance for at least a portion of said trajectory based, at least in part, on an electronic map that is indicative of a presence or an absence of one or more obstacles within at least said portion of said trajectory; and initiate presentation of an indication of a position uncertainty via said user interface mechanism, said position uncertainty being based, at least in part, on said measure of potential hindrance, wherein said indication of said position uncertainty indicates an increased position uncertainty responsive to a higher measure of potential hindrance for said at least a portion of said trajectory and said indication of said position uncertainty indicates a decreased position uncertainty responsive to a lower measure of potential hindrance.

13. The mobile device as recited in claim 12, wherein said electronic map is indicative of a presence of said one or more obstacles within at least said portion of said trajectory, and said measure of potential hindrance is determined based, at least in part, on a type of at least one of said one or more obstacles.

14. The mobile device as recited in claim 13, wherein said type of said one or more obstacles comprises: an exterior wall, an interior space-defining wall, an interior space-dividing wall, an interior hallway-facing wall, a structural feature, a fixed non-structural feature, or a non-fixed non-structural feature.

15. The mobile device as recited in claim 13, wherein at least one of said one or more obstacles comprises a wall, and wherein a first portion of said wall comprises a first type of obstacle and a second portion of said wall comprises a second type of obstacle.

16. The mobile device as recited in claim 12, wherein said electronic map is indicative of said presence of said one or more obstacles within at least said portion of said trajectory, and said measure of potential hindrance is determined based, at least in part, on a number of said one or more obstacles.

17. The mobile device as recited in claim 12, said processing unit being further configured to identify at least one of said one or more obstacles based, at least in part, on said electronic map.

18. An apparatus for use in a mobile device, the apparatus comprising:

means for estimating a trajectory of said mobile device within a particular environment comprising an indoor region, said trajectory extending from a first position towards a second position;

means for determining a measure of potential hindrance for at least a portion of said trajectory based, at least in part, on an electronic map that is indicative of a presence or an absence of one or more obstacles within at least said portion of said trajectory; and means for presenting an indication of a position uncertainty, said position uncertainty being based, at least in part, on said measure of potential hindrance, wherein said indication of said position uncertainty indicates an increased position uncertainty responsive to a higher measure of potential hindrance for said at least a portion of said trajectory and said indication of said position uncertainty indicates a decreased position uncertainty responsive to a lower measure of potential hindrance.

19. The apparatus as recited in claim 18, wherein said electronic map is indicative of said presence of said one or more obstacles within at least said portion of said trajectory, and said measure of potential hindrance is determined based, at least in part, on a type of at least one of said one or more obstacles.

20. The apparatus as recited in claim 19, wherein said type of said one or more obstacles comprises: an exterior wall, an interior space-defining wall, an interior hallway-facing wall, an interior space-dividing wall, a structural feature, a fixed non-structural feature, or a non-fixed non-structural feature.

21. The apparatus as recited in claim 20, wherein at least one of said one or more obstacles comprises a wall, and wherein a first portion of said wall comprises a first type of obstacle and a second portion of said wall comprises a second type of obstacle.

22. The apparatus as recited in claim 18, wherein said electronic map is indicative of said presence of said one or more obstacles within at least said portion of said trajectory, and said measure of potential hindrance is determined based, at least in part, on a number of said one or more obstacles.

23. The apparatus as recited in claim 18, and further comprising means for identifying at least one of said one or more obstacles based, at least in part, on said electronic map.

24. An article comprising:

a non-transitory computer readable medium have stored therein computer implementable instructions executable by a processing unit of a mobile device to:

estimate a trajectory of said mobile device within a particular environment comprising an indoor region, said trajectory extending from a first position towards a second position;

determine a measure of potential hindrance for at least a portion of said trajectory based, at least in part, on an electronic map that is indicative of a presence or an absence of one or more obstacles within at least said portion of said trajectory; and initiate presentation of an indication of a position uncertainty, said position uncertainty being based, at least in part, on said measure of potential hindrance, wherein said indication of said position uncertainty indicates an increased position uncertainty responsive to a higher measure of potential hindrance for said at least a portion of said trajectory and said indication of said position uncertainty indicates a decreased position uncertainty responsive to a lower measure of potential hindrance.

25. The article as recited in claim 24, wherein said electronic map is indicative of said presence of said one or more obstacles within at least said portion of said trajectory, and said measure of potential hindrance is determined based, at least in part, on a type of at least one of said one or more obstacles.

26. The article as recited in claim 25, wherein said type of said one or more obstacles comprises: an exterior wall, an interior space-defining wall, an interior space-dividing wall, an interior hallway-facing wall, a structural feature, a fixed non-structural feature, or a non-fixed non-structural feature.

27. The article as recited in claim 25, wherein at least one of said one or more obstacles comprises a wall, and wherein a first portion of said wall comprises a first type of obstacle and a second portion of said wall comprises a second type of obstacle.

28. The article as recited in claim 24, wherein said electronic map is indicative of said presence of said one or more obstacles within at least said portion of said trajectory, and said measure of potential hindrance is determined based, at least in part, on a number of said one or more obstacles.

29. The article as recited in claim 24, said computer implementable instructions being further executable by said processing unit to identify at least one of said one or more obstacles based, at least in part, on said electronic map.

* * * * *